Patented Apr. 21, 1925.

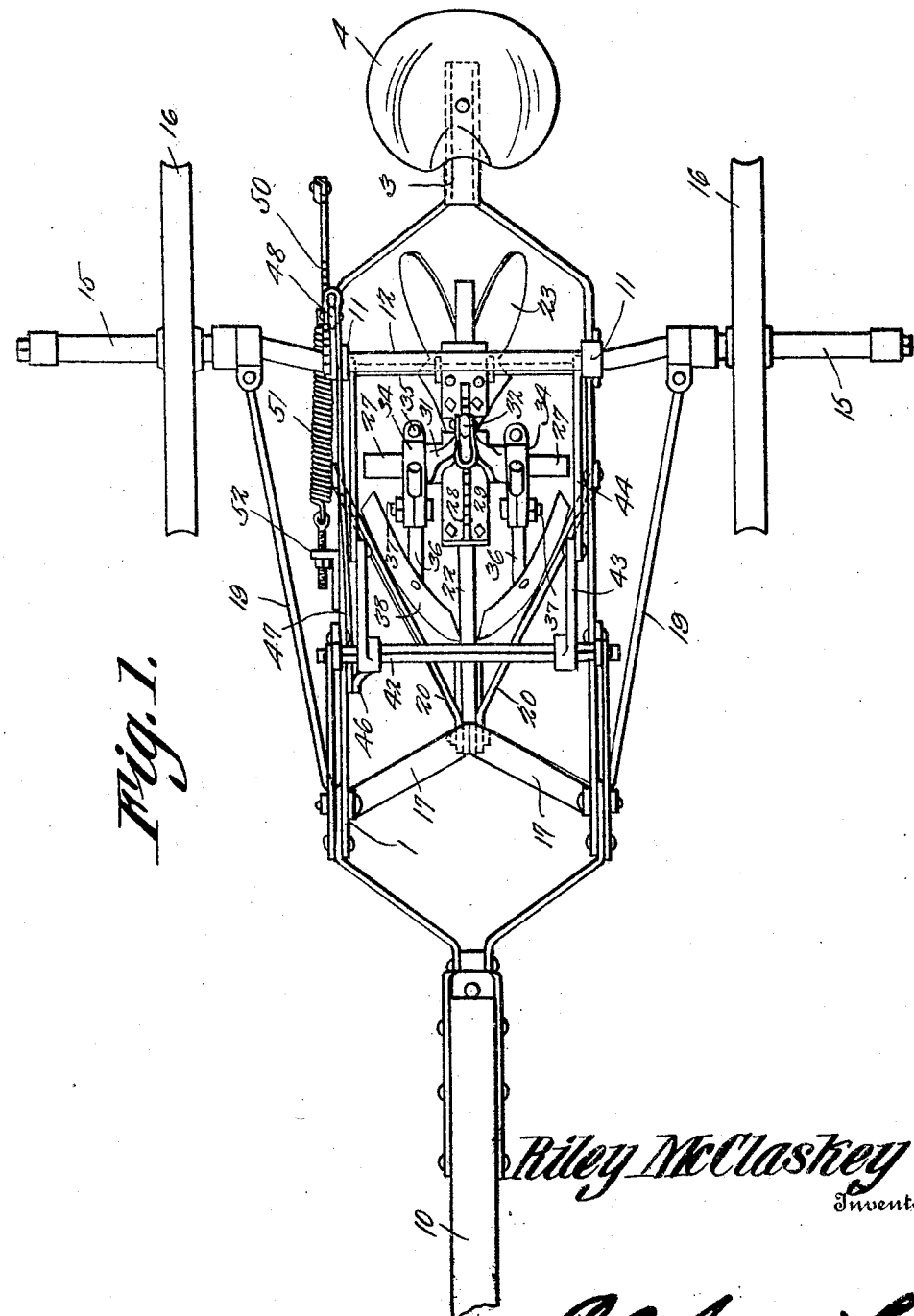

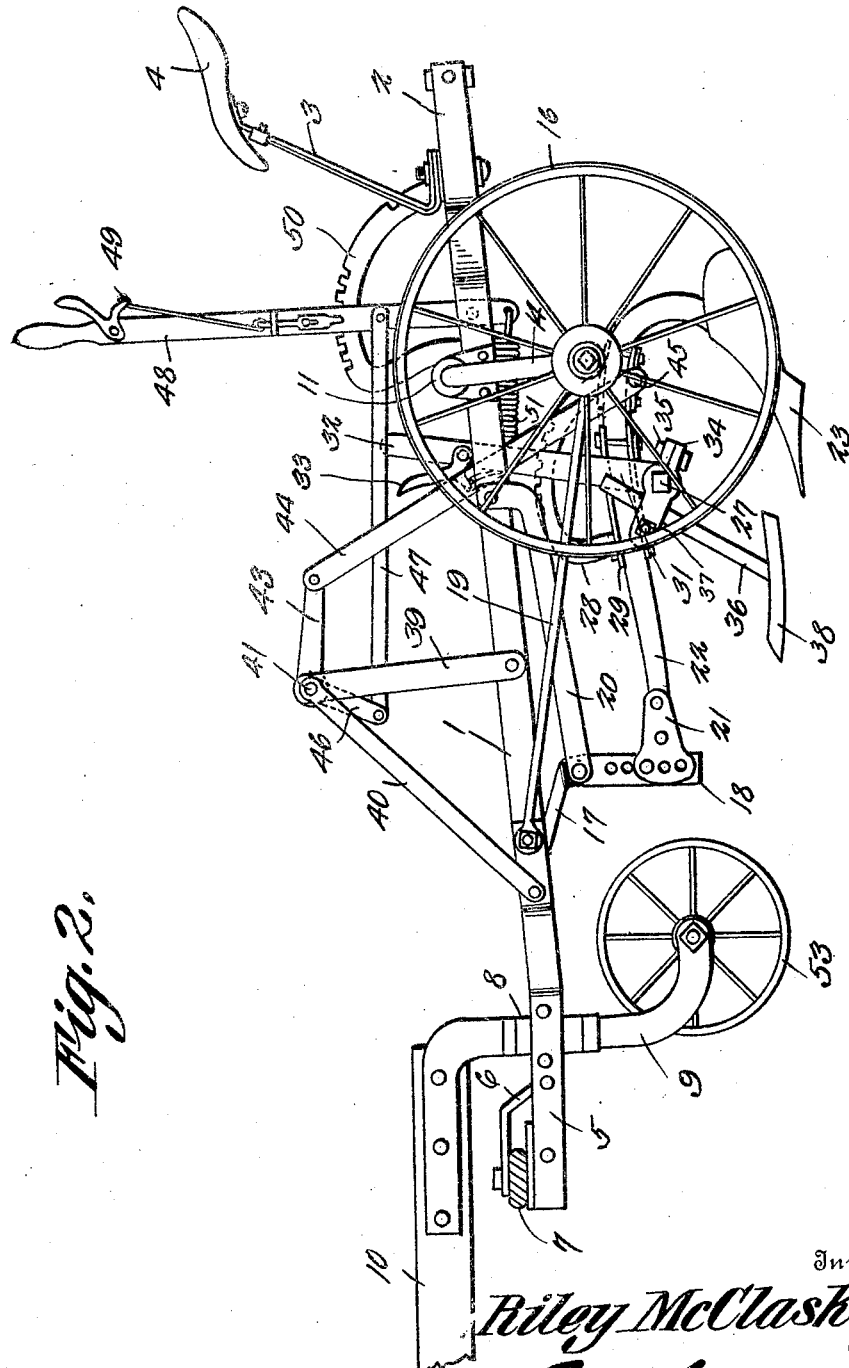

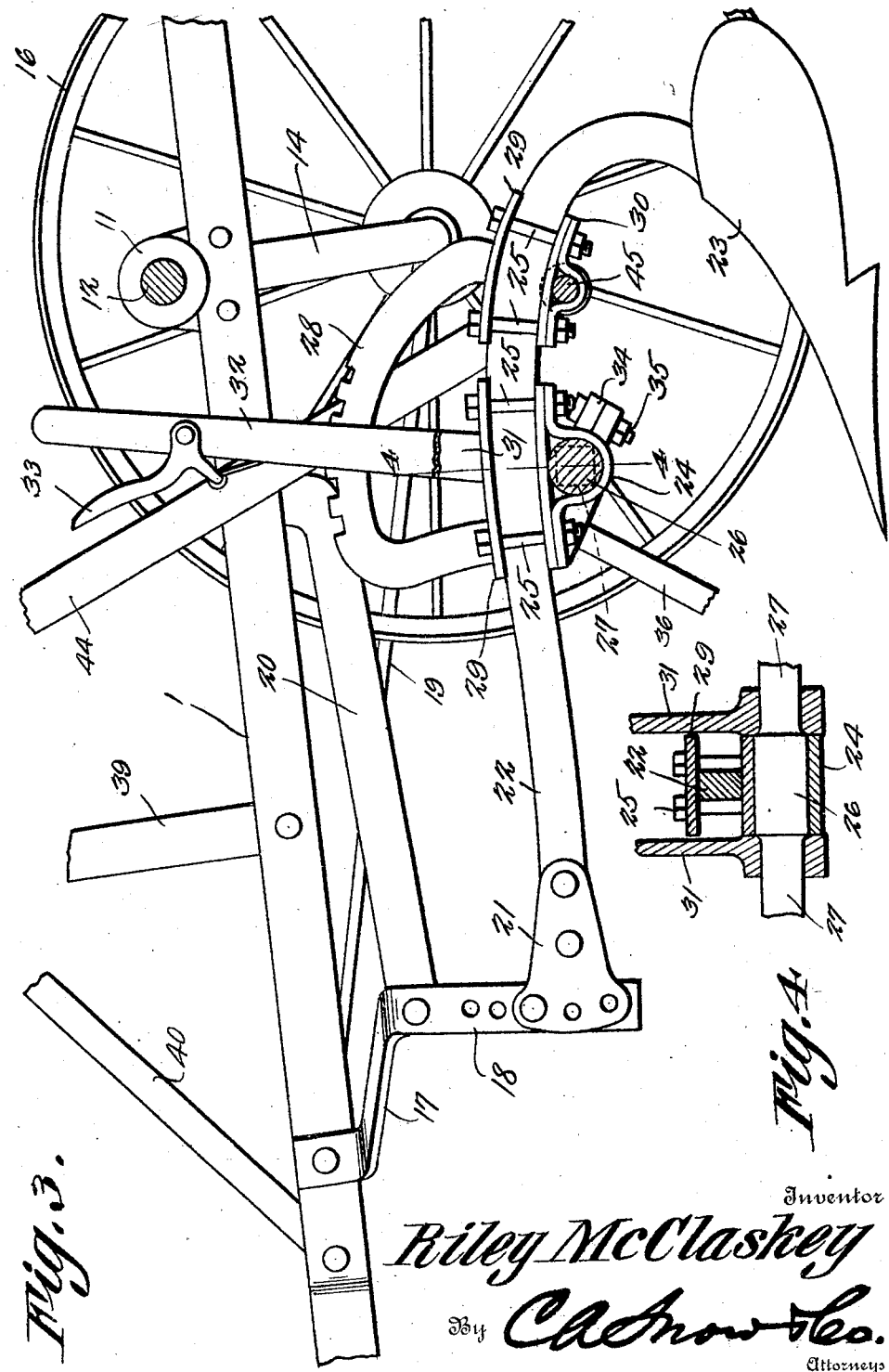

1,534,234

UNITED STATES PATENT OFFICE.

RILEY McCLASKEY, OF IDAHO FALLS, IDAHO.

IMPLEMENT-ADJUSTING MEANS.

Application filed January 23, 1923. Serial No. 614,441.

*To all whom it may concern:*

Be it known that I, RILEY McCLASKEY, a citizen of the United States, residing at Idaho Falls, in the county of Bonneville and State of Idaho, have invented a new and useful Implement-Adjusting Means, of which the following is a specification.

This invention aims to provide a combined weeder and lister which will be of easy draft, wide latitude of adjustment being provided, novel means being supplied for varying the position of the cutting blades, and novel means being supplied for raising and lowering the plow share with respect to the soil.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a side elevation; Figure 3 is a longitudinal section, most parts appearing in elevation, and parts being broken away; Figure 4 is a section on the line 4—4 of Figure 3.

In carrying out the invention, there is provided a loop-shaped wheel-mounted main frame 1 having a reduced rear extension 2 whereon a standard 3 is mounted, the standard carrying a seat 4. The frame 1 has a reduced forward extension 5 provided with suitable means 6 for supporting a draft tree 7, the extension 5 carrying a bearing 8 wherein the stem of a rearwardly extended fork 9 is journaled, a ground wheel 53 being journaled on the fork 9. To the upper end of the stem of the fork 9, a tongue 10 is secured.

Bearings 11 are mounted on the side portions of the frame 1 and receive the intermediate portion of an arched axle 12 having depending arms 14 provided with outstanding spindles 15, on which ground wheels 16 are journaled, the spindles 15 being of sufficient length to provide for the necessary inward and outward adjustment of the ground wheels 16. Adjacent to its forward end, the side portions of the frame 1 are connected by braces 17 having depending ends 18, braces 20 extending between the ends 18 of the members 17 and the side portions of the frame 1. Radius rods 19 extend between the side portions of the frame 1 and the axle spindles 15.

A clevis 21 is mounted for vertical adjustment on the depending ends 18 of the braces 17, the beam 22 of a plow share 23 being connected at its forward end to the clevis 21.

Bearings 24 and 30 are located beneath the plow beam 22, the bearing 30 being disposed to the rear of the bearing 24. A segment 28 is located above the plow beam 22 and has feet 29 connected by securing elements 25 with the bearings 24 and 30. In the bearing 24 a shaft 26 is journaled, the shaft having squared ends 27. The forward foot of the segment 28 is straddled by the forks 31 of a lever 32, the forks being mounted on the squared ends 27 of the shaft 26. The lever 32 is supplied with a latch mechanism 33 adapted to cooperate with the segment 28. Forwardly extended clamps 34 are held at 35 on the squared ends 27 of the shaft 26 for adjustment longitudinally of the shaft. Depending standards 36 are held at 37, for vertical adjustment in the forward ends of the clamps 34, the clamps constituting, in effect, crank arms on the shaft 26. Soil-engaging elements, such as weeding blades 38 are mounted on the lower ends of the standards 36 and since the standards 36 may be adjusted vertically in the clamps 34, the blades 38 may be adjusted vertically with respect to the soil.

Upstanding bearing posts 39 are erected on the side portions of the frame 1 to the rear of the hanger 17—18 and are sustained from the frame by braces 40. A first shaft 41 is mounted to rock in the bearing posts 39 and has a squared intermediate portion 42 retaining rearwardly extended arms 43 whereunto downwardly extended links 44 are pivoted, the links 44 being disposed at an acute angle to the vertical, and lower ends of the links being connected to a shaft 45 mounted to rock in the bearing 30 on the plow beam 22. The shaft 41 carries a depending arm 46, located at one end of the shaft.

The forward end of a first link 47 (located about the frame 1) is pivoted to the arm 46 and the rear end of the link is pivoted to a first lever 48 fulcrumed intermediate its ends on one side portion of the frame 1 and provided with a latch mechanism 49 adapted to coact with a segment 50 on the frame 1. A retractile spring 51 is secured at its lower end to the lever 48, below the fulcrum of the lever, the forward end of the spring 51 being adjustably secured at 52 to one side portion of the frame 1, as shown best in Figure 1.

Through the instrumentality of the lever 48, the link 47, the arm 46, the shaft 41, the arms 43 and the second links 44, the beam 22 and the plow share 23 may be raised and lowered with the connection between the clevis 21 and the parts 18 as a fulcrum. Rotation may be imparted to the second shaft 26 by way of the second lever 32, the forward ends of clamps or crank arms 34 swinging upwardly and downwardly, the angle between the blades 38 and the surface of the soil being varied, and the position of the blades with respect to the share 23 being adjusted. Since the standards 36 which carry the blades 38 may be adjusted vertically in the clamps 34, the blades 38 may be raised and lowered for adjustment, with respect to the soil.

What is claimed is:—

In a device of the class described, a wheel-mounted frame, a depending hanger carried by the frame, a beam located below the frame and having its forward end pivoted to the hanger, upstanding bearing posts on the frame to the rear of the hanger, a first shaft journaled in the bearing posts, the first shaft having a depending arm and a rearwardly extended arm, a first lever under the control of an operator and fulcrumed on the frame, means for holding the first lever in adjusted positions, a first link located above the frame and pivoted to the first lever and to the depending arm of the first shaft, a second link disposed between the shaft and the first lever and disposed at an acute angle to the vertical, the second link being pivoted to the rearwardly extended arm of the first shaft, and to the beam near to the rear thereof, a second shaft mounted to rock on the beam, a forwardly extended arm carried by the second shaft, a downwardly extending soil engaging element mounted on the last-specified arm, an upstanding second lever mounted on the second shaft, a latch mechanism carried by the second lever, and a segment on the beam, the latch mechanism cooperating with the segment.

In testimony that I claim the foregoing as my own, I have hereto affixed my signature in the presence of two witnesses.

RILEY McCLASKEY.

Witnesses:
C. H. McCLASKEY,
R. S. OLEY.